(12) United States Patent
Xue et al.

(10) Patent No.: US 12,467,394 B2
(45) Date of Patent: Nov. 11, 2025

(54) SELECTIVE CATALYTIC REDUCTION (SCR) SYSTEM AND ENGINE

(71) Applicant: WEICHAI POWER CO., LTD., Shandong (CN)

(72) Inventors: Yudan Xue, Shandong (CN); Jianwei Li, Shandong (CN); Dailong Shi, Shandong (CN); Min Ju, Shandong (CN); Qiang Liu, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/725,777

(22) PCT Filed: Jan. 13, 2023

(86) PCT No.: PCT/CN2023/072094
§ 371 (c)(1),
(2) Date: Jun. 30, 2024

(87) PCT Pub. No.: WO2023/138506
PCT Pub. Date: Jul. 27, 2023

(65) Prior Publication Data
US 2025/0101897 A1    Mar. 27, 2025

(30) Foreign Application Priority Data
Jan. 18, 2022    (CN) .......................... 202210055994.1

(51) Int. Cl.
*F01N 3/20*    (2006.01)
*B01F 25/30*   (2022.01)
(Continued)

(52) U.S. Cl.
CPC ......... *F01N 3/2066* (2013.01); *F01N 3/2803* (2013.01); *F01N 3/2892* (2013.01);
(Continued)

(58) Field of Classification Search
CPC .. B01F 25/30; B01F 25/305; B01F 25/31112; B01F 25/3121; B01F 25/31214;
(Continued)

(56) References Cited

U.S. PATENT DOCUMENTS

| 10,914,218 B1* | 2/2021 | Chapman | F01N 3/0871 |
| 2013/0213013 A1* | 8/2013 | Mitchell | F01N 3/2066 |
| | | | 73/23.31 |

(Continued)

FOREIGN PATENT DOCUMENTS

| CN | 106285863 A | 1/2017 |
| CN | 107257709 A | 10/2017 |

(Continued)

OTHER PUBLICATIONS

International Search Report for PCT/CN2023/072094 mailed Apr. 24, 2023, ISA/CN.

*Primary Examiner* — Binh Q Tran
(74) *Attorney, Agent, or Firm* — Yue (Robert) Xu; Apex Attorneys at Law, LLP

(57) ABSTRACT

A selective catalytic reduction (SCR) system, comprising a box body, a mixer, a baffle and a carrier, the mixer, the baffle and the carrier being sequentially arranged inside the box body in an airflow direction inside the box body, the baffle being provided with a plurality of through holes, and the distribution density of the through holes and/or the hole area of the through holes being negatively correlated with a distribution uniformity index of $NH_3$ at the baffle. The configuration of the distribution density and the hole area of the through holes can improve the mixing uniformity of ammonia gas, so that a reaction effect of a catalyst and a mixed gas in the carrier is enhanced. The settings of the distribution density and the hole area of the through holes can improve the mixing uniformity of an ammonia gas.

16 Claims, 3 Drawing Sheets

(51) Int. Cl.
*B01F 25/40* (2022.01)
*B01F 25/41* (2022.01)
*F01N 3/28* (2006.01)

(52) U.S. Cl.
CPC ............... *B01F 25/30* (2022.01); *B01F 25/40* (2022.01); *B01F 25/41* (2022.01); *F01N 3/206* (2013.01); *F01N 3/208* (2013.01); *F01N 2240/20* (2013.01); *F01N 2330/38* (2013.01); *F01N 2470/02* (2013.01); *F01N 2490/08* (2013.01); *F01N 2610/02* (2013.01)

(58) Field of Classification Search
CPC .......... B01F 25/40; B01F 25/41; B01F 25/42; B01F 25/422; B01F 25/4233
See application file for complete search history.

(56) References Cited

U.S. PATENT DOCUMENTS

| | | | |
|---|---|---|---|
| 2014/0165540 A1* | 6/2014 | Fischer | F01N 13/009 422/162 |
| 2016/0215673 A1* | 7/2016 | Noren, IV | B01F 25/4521 |
| 2016/0243510 A1 | 8/2016 | Denton et al. | |
| 2020/0123955 A1* | 4/2020 | Liu | B01F 25/31425 |
| 2021/0199039 A1* | 7/2021 | Panunzio | B01D 53/9477 |
| 2022/0178293 A1* | 6/2022 | Lu | B01D 53/944 |

FOREIGN PATENT DOCUMENTS

| | | |
|---|---|---|
| CN | 109356693 A | 2/2019 |
| CN | 109826697 A | 5/2019 |
| CN | 109915241 A | 6/2019 |
| CN | 114542247 A | 5/2022 |
| JP | 2007021422 A | 2/2007 |

* cited by examiner

SELECTIVE CATALYTIC REDUCTION (SCR) SYSTEM AND ENGINE

This application claims the priority of the Chinese Patent Application No. 202210055994.1, titled "SCR SYSTEM AND ENGINE", filed on Jan. 18, 2022 with the China National Intellectual Property Administration, which is incorporated herein by reference in its entirety.

FIELD

The present application relates to the technical field of engine, for example, to a selective catalytic reduction (SCR) system. The present application further relates to an engine.

BACKGROUND

Generally, the conventional selective catalytic reduction (SCR) system is provided with a mixer. A urea is mixed with an exhaust gas in the mixer, and the distribution of $NH_3$ in the mixed gas is usually uneven. After entering a carrier, the mixed gas reacts with the catalyst inside the carrier to generate clean substances. The uneven distribution of $NH_3$ can deteriorate a reaction effect with catalysts, leading to a decrease of SCR conversion efficiency.

SUMMARY

An SCR system and an engine are provided in the present application, which can deal with the issue in the conventional SCR system where the uneven distribution of $NH_3$ entering into the carrier leads to a decrease of the SCR conversion efficiency.

In a first aspect of the present application, an SCR system is provided, which includes: a box body; a mixer; a baffle; and a carrier, wherein the mixer, the baffle, and the carrier are sequentially arranged inside the box body in a flowing direction of a gas flow in the box body, the baffle is provided with a plurality of through holes, and a distribution density of the plurality of through holes and/or an opening area of the plurality of through holes are negatively correlated with a distribution uniformity index of $NH_3$ at the baffle.

In the selective oxidation-reduction SCR system in the present application, the baffle is provided between the mixer and the carrier. Based on the uniformity of $NH_3$ in front of the carrier, at least one of the density of the through-holes in the baffle and the opening area of the through-holes can be adjusted to re-mix $NH_3$ with the exhaust gas, thereby improving the distribution uniformity of $NH_3$ and the gas velocity uniformity, and improving the SCR conversion efficiency. The present application can be applied to the post-processing of all structures, adjusting the hole density in the baffle according to the distribution uniformity of $NH_3$ in front of the carrier, and thus achieving a perfect match with the post-processing of various structures and various engine displacements. Moreover, the SCR system has a high reliability without a complex connection installation structure.

In some embodiments of the present application, the distribution uniformity index is obtained based on a formula:

$$U_{vapor} = 1 - \frac{1}{2}\sum_{i=1}^{n} \frac{|m_i'' - m_{mean}''|A_i}{Am_{mean}''}$$

where $m''_i$ is an $NH_3$ mass fraction value on individual grids on a selected plane, $m''_{mean}$ is an average $NH_3$ mass fraction value on the selected plane, $A_i$ is an area of individual grids on the selected plane, and A is the area of the selected plane.

In some embodiments of the present application, no through-holes are provided at a position of the baffle where the distribution uniformity index is greater than a preset threshold.

In some embodiments of the present application, the distribution density of through-holes is negatively correlated with a gas flow velocity at the baffle.

In some embodiments of the present application, the plurality of through-holes include multiple first gas holes and multiple second gas holes. The first gas holes are arranged around the second gas holes, and the opening area of each first gas hole is smaller than that of each second gas hole.

In some embodiments of the present application, the second gas holes are each fan-shaped. The through holes further include a third gas hole located at a center of the baffle, and the second gas holes are arranged to surround the third gas hole.

In some embodiments of the present application, the first gas holes are each in a shape of circular.

In some embodiments of the present application, the third gas hole is circular.

In some embodiments of the present application, the baffle is arranged perpendicular to an axial direction of the box body.

In a second aspect of the present application, an engine is provided, which includes the SCR system according to the first aspect of the present application.

DETAILED DESCRIPTION OF THE EMBODIMENTS

It should be understood that the terms used in the context are only for the purpose of describing specific exemplary embodiments and are not intended to limit. Unless otherwise explicitly stated in the context, a singular form such as "a", "an", and "the" used in the text can also indicate the inclusion of a plural form. The terms "comprising", "including", "containing", and "having" are inclusive and therefore indicate the existence of the described features, steps, operations, elements, and/or components, but do not exclude the existence or addition of one or more other features, steps, operations, elements, components, and/or their combinations. The methods, steps, processes, and operations described in the text are not interpreted as requiring them to be executed in the specific order described or explained, unless the order of execution is clearly indicated. It should also be understood that additional or alternative steps may be used.

Although the terms first, second, third and so on can be used in the text to describe multiple elements, components, regions, layers, and/or sections, these elements, components, regions, layers, and/or sections should not be limited by these terms. These terms may be used only to distinguish one element, component, region, layer, or section from another region, layer, or section. Unless explicitly stated, terms such as "first", "second", and other numerical terms used in the text do not imply order or sequence. Therefore, the elements, components, regions, layers, or sections discussed below may be referred to as second element, second component, second region, second layer, or second section without departing from the teachings of exemplary embodiments.

For ease of description, spatial relative relationship terms may be used in the text to describe the relationship between one element or one feature as shown in figures and another element or feature. These relative relationship terms are, for example, "internal", "external", "inside", "side", "under", "below", "on", "above", etc. These spatial relative relationship terms refer to various orientations of devices in use or operation, excluding those depicted in the diagram. For example, if the device in the figure is turned over, an element described as "being under other elements or features" or "being below other elements or features" will then be oriented as "being on other elements or features" or "being above other elements or features". Therefore, the example term "below" may include orientations both of being above and of being below. The device may be further oriented separately (being rotated 90 degrees or being in other directions) and the spatial relative relationship descriptors used in the text are explained accordingly.

Figure 1:
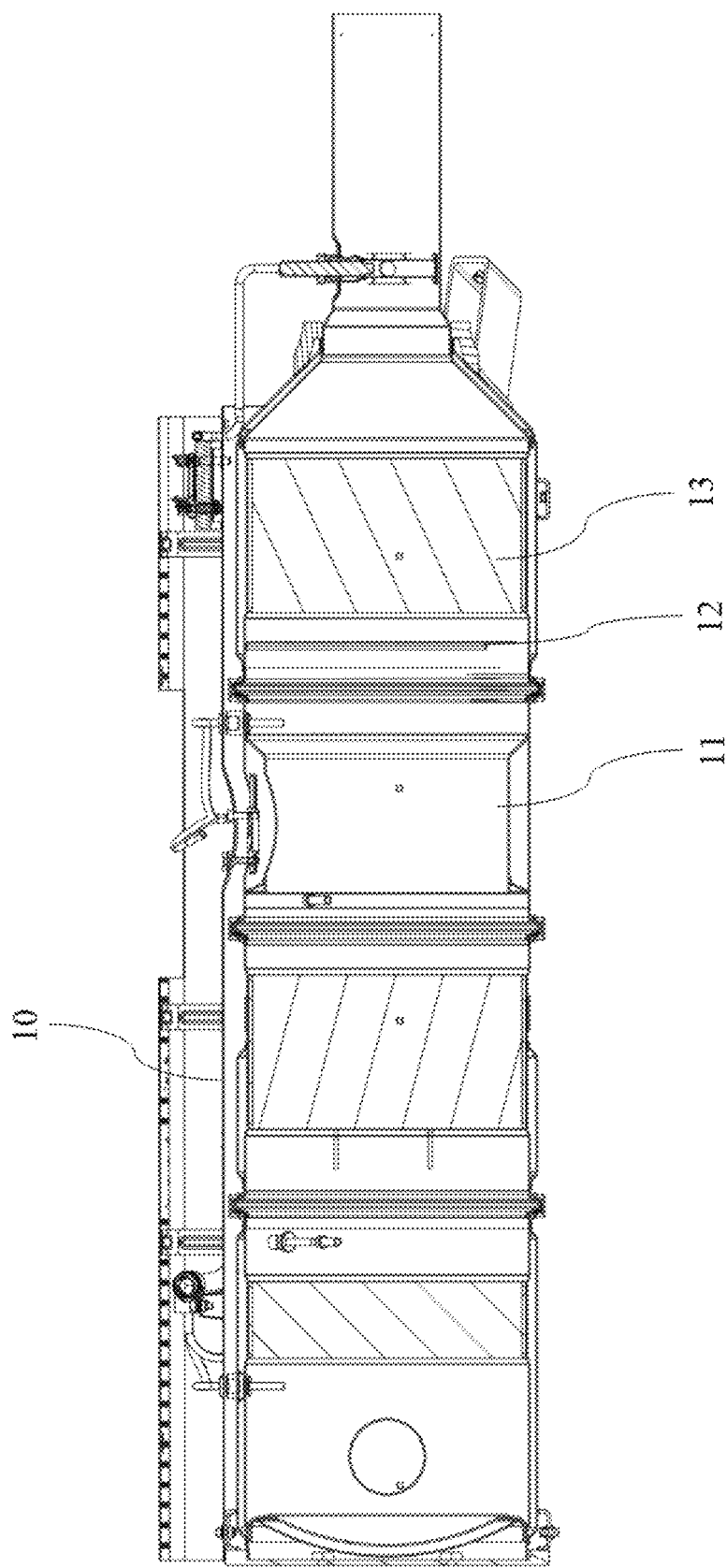
FIG. 1 is a schematic structural view of an SCR system according to an embodiment of the present application.
Figure 2:
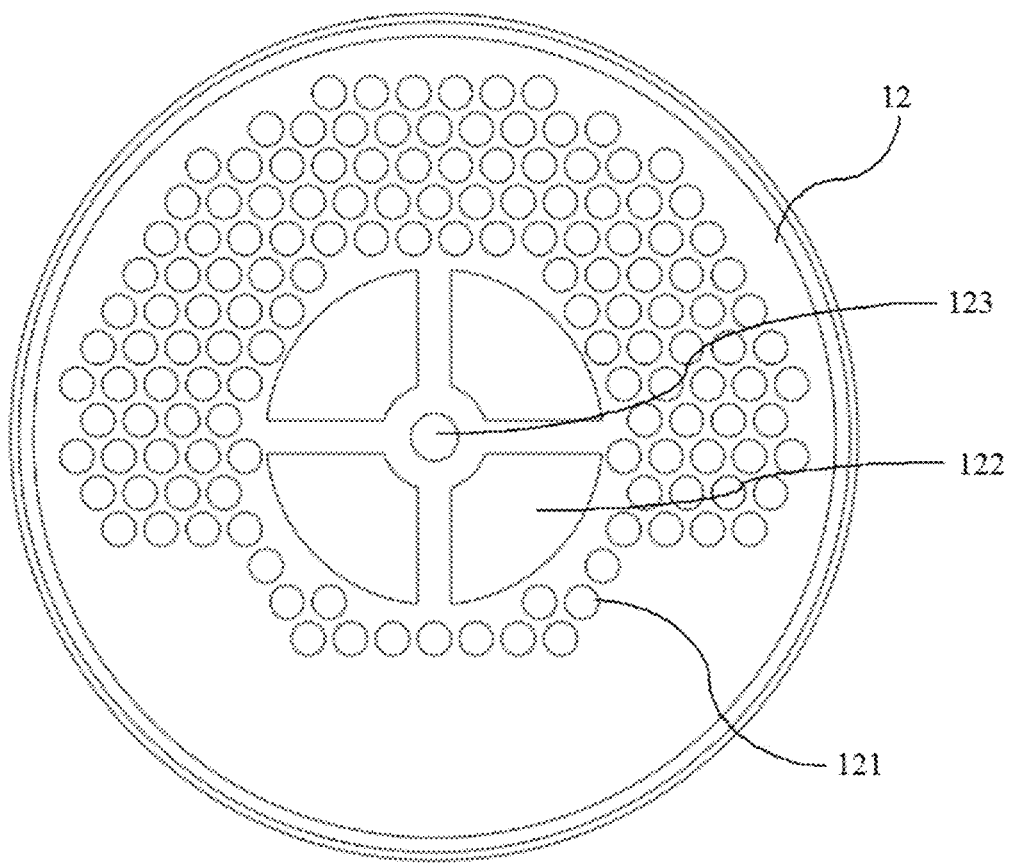
FIG. 2 is a schematic structural view of a baffle according to an embodiment of the present application.

As shown in FIGS. 1 and 2, a SCR system is provided in a first aspect of the present application, which includes a box body 10, a mixer 11, a baffle 12, and a carrier 13. The mixer 11, the baffle 12, and the carrier 13 are sequentially arranged inside the box body 10 in a flowing direction of a gas flow in the box body 10. The baffle 12 is provided with multiple through holes, and a distribution density of the through holes and/or an opening area of the through holes are negatively correlated with a distribution uniformity index of $NH_3$ at the baffle 12.

It should be noted that the principle of SCR technology is to inject fuel or add any other reducing agent into the exhaust gas, to select an appropriate catalyst to promote the reaction between the reducing agent and NOx, and to suppress the oxidation of the reducing agent by oxygen in the exhaust gas. Based on the type of reducing agent, the conventional SCR technology includes a urea SCR technology in which $NH_3$ produced by urea decomposition is used as the reducing agent and a hydrocarbon SCR technology in which a hydrocarbon is used as the reducing agent. At present, the hydrocarbon SCR technology is still under a further research, which is not widely used in practice. The urea SCR technology is relatively mature and has many practical applications. Ammonia is generated from the urea before the SCR reaction actually begins. The urea aqueous solution is sprayed into an exhaust pipe in the form of small droplets through a nozzle, and the water evaporates in a high-temperature exhaust gas, producing granular urea $CO(NH_2)_2$. When the temperature is higher than 180° C., the urea undergoes a pyrolysis reaction to produce isocyanic acid (HNCO) and a portion of $NH_3$. Subsequently, the isocyanic acid produced by pyrolysis undergoes a hydrolysis reaction to produce a portion of $NH_3$ and $CO_2$. $NH_3$—SCR uses $NH_3$ generated by the decomposition of urea in exhaust gas to selectively catalyze NOx.

The box body 10 may be in cylindrical or square barrel shape. One end of the box body 10 is opened to receive an engine exhaust gas. The mixer 11 is provided with a urea nozzle and a gas flow guiding structure. The urea is sprayed through urea nozzle to mix with the exhaust gas. The mixture of the exhaust gas and the urea spray are enhanced through the gas flow guiding structure, so as to improve the mixing uniformity. The mixed gas after being mixed evenly by the mixer 11 passes through the through holes in the baffle 12. The baffle 12 has a low through hole density or even no hole at a position where a $NH_3$ uniformity is high, but has a high through hole density or a large through-opening area at a position where a $NH_3$ uniformity is low. Providing more through hole or a larger through hole can increase the flow velocity of the mixed gas therethrough, thus strengthening the mixing of $NH_3$ with the exhaust gas, and improving the mixing uniformity of the $NH_3$. As such, the distribution of $NH_3$ in the mixed gas entering the carrier 13 is move even, which improves the reaction effect between the catalyst and the mixed gas in the carrier 13 and thus improves a conversion efficiency.

Figure 3:
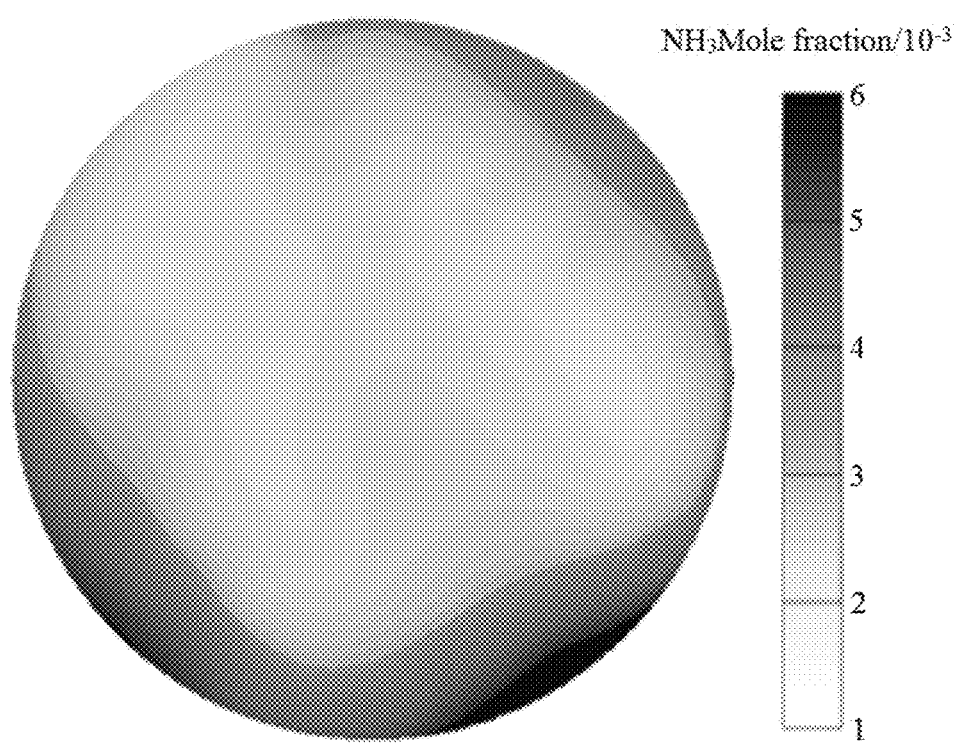
FIG. 3 schematically shows simulation of the baffle according to an embodiment of the present application in a CFD software.

As shown in FIG. 3, the distribution uniformity index of $NH_3$ can be simulated using a Computational Fluid Dynamics (CFD) software for the SCR system. With CFD software, the actual structure of the SCR system is modeled, and boundary conditions and fluid information and so on are inputted into the CFD software. The CFD software divides the SCR system into grids, simulates the gas reaction and the gas flow, and calculates based on these grids, so as to obtain the data and graph of $NH_3$ distribution (i.e. FIG. 3). The greater the mole fraction of $NH_3$ in an area in FIG. 3 is, the darker the color of this area is, thereby obtaining the distribution uniformity index of $NH_3$.

The SCR system in the present application is provided with a baffle 12 between the mixer 11 and the carrier 13. The density of the through-holes in the baffle 12 is adjusted based on the uniformity of $NH_3$ in front of the carrier 13, so that $NH_3$ is re-mixed with the exhaust gas to improve the uniformity of both the $NH_3$ distribution and a gas velocity, thus improving the SCR conversion efficiency. This application can be applied to a post-processing of all structures, which adjusts the hole density in the baffle 12 based on the distribution uniformity of the $NH_3$ in front of the carrier 13, achieving a perfect match with the post-processing of various structures and various engine displacements. Moreover, the SCR system has a high reliability without a complex connection installation structure.

In some embodiments of the present application, the distribution uniformity index is obtained based on a formula:

$$U_{vapor} = 1 - \frac{1}{2}\sum_{i=1}^{n} \frac{|m_i'' - m_{mean}''|A_i}{Am_{mean}''}$$

where, $m''_i$ is a $NH_3$ mass fraction value on each grid on a selected plane, $m''_{mean}$ is an average $NH_3$ mass fraction value on the selected plane, $A_i$ is an area of each grid on the selected plane, and A is an area of the selected plane. The above selected plane may be taken from a radial section of the box body 10 located between the mixer 11 and the carrier 13. The radial section is input into the CFD software, which calculates and analyzes the SCR system model to obtain a value of $U_{vapor}$. The calculation method for the distribution uniformity index mentioned above is carried out through the computer software, which has a high calculation accuracy, fast speed, and can avoid errors caused by calculation.

In addition, the gas velocity distribution uniformity at the baffle 12 is obtained according to a formula:

$$U_{flow} = 1 - \frac{1}{2}\sum_{i=1}^{n}\frac{|\omega_i - \omega_{mean}|A_i}{A\omega_{mean}}$$

where, $\omega_i$ is a gas velocity value on each grid on the select plane, and $\omega_{mean}$ is an average gas velocity value on the select plane. The above values are also calculated using the CFD software. The through-holes in the baffle 12 are arranged in an inverse proportion to the $NH_3$ distribution uniformity, and thus the gas velocity distribution uniformity at the baffle 12 is correspondingly improved.

In some embodiments of the present application, the distribution density of through-holes is also negatively correlated with the gas flow velocity at the baffle 12. In areas with a large gas flow velocity, the flow velocity of the mixed gas can be weaken by passing through baffle 12, resulting in a better uniformity of the flow velocity of the mixed gas on the entire plane, without causing the situation of some areas with a high gas flow velocity and others with a low gas flow velocity. The above arrangement also improves the distribution uniformity of $NH_3$, thereby improving the conversion efficiency of the SCR system.

In some embodiments of the present application, multiple through-holes include multiple first gas holes 121 and multiple second gas holes 122. The first gas holes 121 are arranged to surround the multiple second gas holes 122, and the opening area of the first gas hole 121 is smaller than that of the second gas hole 122. The first gas hole 121 can be in shape of circular, polygon, etc., and the second gas hole 122 can be in arc-shaped, fan-shaped, etc., which is not limited here. According to the calculation results of the CFD software, the distribution uniformity of $NH_3$ close to a center of the baffle 12 is worse than that at an edge of the baffle 12. Therefore, through-holes with a higher density or a larger cross-sectional area, i.e., the second gas holes 122, may be arranged close to the center of the baffle 12, so as to increase the gas flow velocity there, to strengthen the mixing of $NH_3$ with exhaust gas, and to improve the distribution uniformity of $NH_3$.

In some embodiments of the present application, the second gas hole 122 is fan-shaped. The multiple through holes further include a third gas hole 123. The third gas hole 123 is located at the center of the baffle 12, and multiple second gas holes 122 are arranged to surround the third gas hole 123. Four fan-shaped second gas holes 122 can be arranged around the third gas hole 123 in a circle. According to a CFD software simulation, the distribution uniformity of $NH_3$ at the center of the baffle 12 is higher than that slightly outside the center of the baffle 12. Therefore, the third gas hole 123 can be configured to have a smaller opening area than the second gas hole 122, which improves the gas flow velocity at the position of the baffle 12 where a distribution uniformity of $NH_3$ is poor, and thus improves the distribution uniformity of $NH_3$ and the SCR conversion efficiency.

In some embodiments of the present application, no through-holes are provided at a position of the baffle 12 where the distribution uniformity index is greater than a preset threshold. A preset threshold may be determined based on the actual situation and the calculation result of the CFD software. No through holes are provided at a position of baffle 12 where the distribution uniformity index is high, in order to avoid further weakening the $NH_3$ distribution uniformity of the baffle 12.

In some embodiments of the present application, the first gas holes 121 are in shape of circular, and the third gas hole 123 is in shape of circular. The circular gas hole facilitates processing and has a good gas circulation effect.

In some embodiments of the present application, the baffle 12 is arranged perpendicular to an axial direction of the box body 10, which facilitates mounting the baffle 12 and adjusting the gas flow direction in front of the baffle 12. In addition, the outer edge of the baffle 12 can be fixed to an inner side wall of the box body 10 by welding or bolt connection.

According to a second aspect of the present application, an engine is provided, which includes the SCR system in the first aspect of the present application.

The engine in the second aspect of this application has the same beneficial effects as the SCR system in the first aspect of this application, which will not be repeated here.

The invention claimed is:
1. A selective catalytic reduction system, comprising:
a box body;
a mixer;
a baffle; and
a carrier, wherein
the mixer, the baffle, and the carrier are sequentially arranged inside the box body in a flowing direction of a gas in the box body,
the baffle is provided with a plurality of through holes, and a distribution density of the plurality of through holes and/or an opening area of the plurality of through holes are negatively correlated with a distribution uniformity index of $NH_3$ at the baffle, and
the distribution uniformity index is obtained based on a formula:

$$U_{vapor} = 1 - \frac{1}{2}\sum_{i=1}^{n}\frac{|m''_i - m''_{mean}|A_i}{Am''_{mean}}$$

wherein, $m''_i$ is an $NH_3$ mass fraction value on each grid on a selected plane, $m''_{mean}$ is an average $NH_3$ mass fraction value on the selected plane, $A_i$ is an area of each grid on the selected plane, and A is an area of the selected plane.

2. The selective catalytic reduction system according to claim 1, wherein no through-holes are provided at a position of the baffle where the distribution uniformity index is greater than a preset threshold.

3. The selective catalytic reduction system according to claim 1, wherein the distribution density of the through-holes is negatively correlated with a gas flow velocity at the baffle.

4. The selective catalytic reduction system according to claim 1, wherein the plurality of through-holes comprise a plurality of first gas holes and a plurality of second gas holes,
the plurality of first gas holes are arranged to surround the plurality of second gas holes, and an opening area of each of the plurality of first gas holes is smaller than that of each of the plurality of second gas holes.

5. The selective catalytic reduction system according to claim 4, wherein each of the plurality of second gas holes is fan-shaped,
the plurality of through holes further comprise a third gas hole, the third gas hole is located at a center of the baffle, and the plurality of second gas holes are arranged around the third gas hole.

6. The selective catalytic reduction system according to claim 4, wherein each of the plurality of first gas holes is in shape of circular.

7. The selective catalytic reduction system according to claim 5, wherein the third gas hole is in shape of circular.

8. The selective catalytic reduction system according to claim 1, wherein the baffle is arranged perpendicular to an axial direction of the box body.

9. An engine, comprising a selective catalytic reduction system, wherein the selective catalytic reduction system comprises:
a box body;
a mixer;
a baffle; and
a carrier, wherein
the mixer, the baffle, and the carrier are sequentially arranged inside the box body in a flowing direction of a gas in the box body,
the baffle is provided with a plurality of through holes, and a distribution density of the plurality of through holes and/or an opening area of the plurality of through holes are negatively correlated with a distribution uniformity index of $NH_3$ at the baffle, and
the distribution uniformity index is obtained based on a formula:

$$U_{vapor} = 1 - \frac{1}{2}\sum_{i=1}^{n} \frac{|m_i'' - m_{mean}''|A_i}{Am_{mean}''}$$

wherein, $m_i''$ is an $NH_3$ mass fraction value on each grid on a selected plane, $m_{mean}''$ is an average $NH_3$ mass fraction value on the selected plane, $A_i$ is an area of each grid on the selected plane, and A is an area of the selected plane.

10. The engine according to claim 9, wherein no through-holes are provided at a position of the baffle where the distribution uniformity index is greater than a preset threshold.

11. The engine according to claim 9, wherein the distribution density of the through-holes is negatively correlated with a gas flow velocity at the baffle.

12. The engine according to claim 9, wherein the plurality of through-holes comprise a plurality of first gas holes and a plurality of second gas holes,
the plurality of first gas holes are arranged to surround the plurality of second gas holes, and an opening area of each of the plurality of first gas holes is smaller than that of each of the plurality of second gas holes.

13. The engine according to claim 12, wherein each of the plurality of second gas holes is fan-shaped,
the plurality of through holes further comprise a third gas hole, the third gas hole is located at a center of the baffle, and the plurality of second gas holes are arranged around the third gas hole.

14. The engine according to claim 12, wherein each of the plurality of first gas holes is in shape of circular.

15. The engine according to claim 13, wherein the third gas hole is in shape of circular.

16. The engine according to claim 9, wherein the baffle is arranged perpendicular to an axial direction of the box body.

* * * * *